US006979513B2

(12) United States Patent
Kelley et al.

(10) Patent No.: US 6,979,513 B2
(45) Date of Patent: Dec. 27, 2005

(54) BATTERY INCLUDING CARBON FOAM CURRENT COLLECTORS

(75) Inventors: Kurtis Chad Kelley, Washington, IL (US); John J. Votoupal, Hudson, IL (US)

(73) Assignee: Firefly Energy Inc., Peoria, IL (US)

( * ) Notice: Subject to any disclaimer, the term of this patent is extended or adjusted under 35 U.S.C. 154(b) by 0 days.

(21) Appl. No.: 10/798,875

(22) Filed: Mar. 12, 2004

(65) Prior Publication Data

US 2004/0191632 A1 Sep. 30, 2004

Related U.S. Application Data

(63) Continuation-in-part of application No. 10/183,471, filed on Jun. 28, 2002.

(51) Int. Cl.[7] ................................................ H01M 2/26
(52) U.S. Cl. ...................... 429/121; 429/233; 429/236
(58) Field of Search ............................... 429/121, 233, 429/236

(56) References Cited

U.S. PATENT DOCUMENTS 1,285,660 A 11/1918 Ford
2,620,369 A 12/1952 Daniel ........................ 136/111
2,658,099 A 11/1953 Basset ........................ 136/121
2,843,649 A 7/1958 Louis ......................... 136/111
3,021,379 A 2/1962 Jackel ........................ 136/145
3,188,242 A 6/1965 Kordesch et al. ............. 136/86
3,442,717 A 5/1969 Horn et al. ................. 136/176
3,565,694 A 2/1971 Chireau ...................... 136/121
3,597,829 A 8/1971 Wagner et al. ............. 29/420.5
3,635,676 A 1/1972 Sands ........................ 23/209.4
3,832,426 A 8/1974 Malthouse et al. ........... 264/29
3,833,424 A 9/1974 Louis et al. .................. 136/86
3,857,913 A 12/1974 Crow et al. ................... 264/29
3,960,770 A 6/1976 Raley, Jr. et al. ........... 252/444
4,011,374 A 3/1977 Kaun ......................... 429/220
4,084,041 A * 4/1978 Ludwig ...................... 429/104
4,086,404 A 4/1978 Vissers et al. ............. 429/220
4,098,967 A 7/1978 Biddick et al. ............. 429/210
4,125,676 A 11/1978 Maricle et al. ............... 429/38
4,134,192 A 1/1979 Parkinson et al. ............... 29/2
4,152,825 A 5/1979 Bruneau .................... 29/623.2
4,188,464 A 2/1980 Adams et al. .............. 429/210
4,224,392 A 9/1980 Oswin ........................ 429/206
4,275,130 A 6/1981 Rippel et al. ............... 429/144
4,339,322 A 7/1982 Balko et al. ................ 204/255
4,363,857 A 12/1982 Mix ........................... 429/234
4,374,186 A 2/1983 McCartney et al. ........ 429/154
4,485,156 A 11/1984 Tokunaga ................... 429/204
4,566,877 A 1/1986 Pazdej et al. .................. 44/51
4,717,633 A 1/1988 Hauser ....................... 429/209
4,722,875 A * 2/1988 Wright ....................... 429/103
4,749,451 A 6/1988 Naarmann ................. 204/58.5
4,758,473 A 7/1988 Herscovici et al. ......... 428/408

(Continued)

FOREIGN PATENT DOCUMENTS

EP 0 555 978 A1 8/1993

(Continued)

OTHER PUBLICATIONS http:www.powertechnologyonline.com/progress.html, Power Technology, Inc, Jan. 15, 2002.

(Continued)

*Primary Examiner*—Dah-Wei Yuan
(74) *Attorney, Agent, or Firm*—Finnegan, Henderson, Farabow, Garrett & Dunner, L.L.P.

(57) ABSTRACT

A battery having a current collector constructed of carbon foam. The carbon foam includes a network of pores into which a chemically active material is disposed to create either a positive or negative plate for the battery. The carbon foam resists corrosion and exhibits a large amount of surface area. The invention includes a method for making the disclosed carbon foam current collector used in the battery.

23 Claims, 4 Drawing Sheets

U.S. PATENT DOCUMENTS 4,865,931 A 9/1989 McCullough, Jr. et al. . 429/194
4,900,643 A 2/1990 Eskra et al. ................ 429/241
4,975,343 A * 12/1990 Coetzer ...................... 429/103
5,017,446 A 5/1991 Reichman et al. .......... 421/225
5,106,709 A 4/1992 Tekkanat et al. ............ 429/210
5,162,172 A 11/1992 Kaun ......................... 429/155
5,200,281 A 4/1993 Leap et al. ................. 429/129
5,208,003 A 5/1993 Simandl et al. ............. 423/445
5,223,352 A 6/1993 Pitts et al. .................. 429/225
5,229,228 A 7/1993 Doniat et al. ............... 429/234
5,260,855 A 11/1993 Kaschmitter et al. ....... 361/502
5,268,395 A 12/1993 Simandl et al. ............. 521/142
5,300,272 A 4/1994 Simandl et al. ............. 423/445
5,348,817 A 9/1994 Rao et al. ................... 429/210
5,374,490 A 12/1994 Aldecoa ..................... 429/152
5,393,619 A 2/1995 Mayer et al. ............... 429/152
5,395,709 A 3/1995 Bowker et al. ............. 429/152
5,402,306 A 3/1995 Mayer et al. ............... 361/502
5,411,818 A 5/1995 Barlow et al. .............. 429/218
5,426,006 A 6/1995 Delnick et al. ............. 429/218
5,429,893 A 7/1995 Thomas ...................... 429/218
5,441,824 A 8/1995 Rippel ......................... 429/53
5,474,621 A 12/1995 Barnard ...................... 136/256
5,498,489 A 3/1996 Dasgupta et al. ........... 424/152
5,508,131 A 4/1996 Bowen et al. .............. 409/210
5,510,359 A 4/1996 Castro Pineiro et al. .... 136/146
5,512,390 A 4/1996 Obushenko ................. 429/204
5,529,971 A 6/1996 Kaschmitter et al. ....... 502/416
5,538,810 A 7/1996 Kaun ......................... 429/129
5,543,247 A 8/1996 Pulley et al. ............... 429/129
5,563,007 A 10/1996 Young et al. ............... 429/139
5,569,563 A 10/1996 Ovshinsky et al. ......... 429/223
5,580,676 A 12/1996 Honda et al. ............... 429/131
5,593,797 A 1/1997 Brecht ........................ 429/210
5,595,840 A 1/1997 Henning et al. ............ 429/210
5,626,977 A 5/1997 Mayer et al. ................. 429/44
5,636,437 A 6/1997 Kaschmitter et al. ......... 29/825
5,643,684 A 7/1997 Tsubouchi et al. .......... 428/605
5,667,909 A 9/1997 Rodriguez et al. .......... 429/127
5,677,075 A 10/1997 Fujita .......................... 429/48
5,705,259 A 1/1998 Mrotek et al. .............. 428/209
5,712,054 A 1/1998 Kejha .......................... 429/21
5,723,232 A 3/1998 Yamada et al. ............. 429/245
5,738,907 A 4/1998 Vaccaro et al. ............. 427/172
5,766,789 A * 6/1998 James et al. .................. 429/44
5,766,797 A 6/1998 Crespi et al. ............... 429/197
5,882,621 A 3/1999 Doddapaneni et al. ...... 423/445
5,888,469 A 3/1999 Stiller et al. ............ 423/445 R
5,898,564 A 4/1999 Mayer et al. ............... 361/508
5,932,185 A 8/1999 Pekala et al. ............... 423/445
5,955,215 A 9/1999 Kurzweil et al. ............. 429/41
5,972,538 A * 10/1999 Saito et al. ................. 429/245
5,993,996 A 11/1999 Firsich .................... 429/231.8
6,001,761 A 12/1999 Hata et al. .................. 501/103
6,033,506 A 3/2000 Klett ........................... 156/78
6,037,032 A 3/2000 Klett et al. ................... 428/71
6,045,943 A 4/2000 Nowaczyk .................. 429/160
6,060,198 A 5/2000 Snaper ...................... 429/233
6,077,464 A 6/2000 Murdie et al. ............. 264/29.5
6,077,623 A 6/2000 Grosvenor et al. ......... 429/210
6,103,149 A 8/2000 Stankiewicz ............... 264/29.1
6,117,592 A 9/2000 Hoshino et al. ............ 429/235
6,127,061 A 10/2000 Shun et al. ................... 429/40
6,146,780 A 11/2000 Cisar et al. ................... 429/34
6,183,854 B1 2/2001 Stiller et al. ............. 428/312.2
6,193,871 B1 2/2001 Coates et al. ............... 205/170
6,217,841 B1 4/2001 Grindatto et al. ........... 423/345
6,241,957 B1 6/2001 Stiller et al. ................ 423/448
6,245,461 B1 6/2001 Smith et al. ............. 429/231.8
6,248,467 B1 6/2001 Wilson et al. ................ 429/39
6,258,473 B1 7/2001 Spillman et al. ............... 429/9
6,261,485 B1 7/2001 Klett ......................... 264/29.6
6,287,721 B1 9/2001 Xie et al. ................... 429/152
6,296,746 B1 10/2001 Broman et al. ............. 204/294
6,316,148 B1 11/2001 Timmons et al. ........... 429/241
6,319,627 B1 11/2001 Snyder et al. ................ 429/62
6,323,160 B1 11/2001 Murdie et al. .............. 508/109
6,332,990 B1 12/2001 Mayer et al. ............... 252/502
6,346,226 B1 2/2002 Stiller et al. ................ 423/448
6,379,845 B1 4/2002 Inazawa et al. ............. 429/235
6,383,687 B1 5/2002 Gibbons et al. ............ 429/233
6,387,343 B1 5/2002 Klett .......................... 423/448
6,395,423 B1 5/2002 Kawakami et al. ......... 429/215
6,399,149 B1 6/2002 Klett et al. ................. 427/230
6,438,964 B1 8/2002 Giblin .......................... 62/3.5
6,500,401 B2 12/2002 Reznek et al. .............. 423/445
6,528,204 B1 3/2003 Hikmet et al. .............. 429/128
6,566,004 B1 5/2003 Fly et al. ....................... 429/39
6,569,559 B1 5/2003 Rouillard et al. ........... 429/120
6,576,365 B1 6/2003 Meitav et al. .............. 429/130
6,605,390 B1 8/2003 Moore et al. ............ 429/231.8
6,631,073 B1 10/2003 Sakata et al. ............... 361/502
6,656,640 B1 * 12/2003 Amiel et al. ................ 429/235
6,670,039 B1 * 12/2003 Nagle et al. ................ 428/408
6,706,079 B1 3/2004 Shmatko et al.
6,869,547 B2 * 3/2005 Barker et al. ............ 252/518.1
6,899,970 B1 * 5/2005 Rogers et al. ................ 429/27
2001/0019800 A1 9/2001 Herreyre et al.
2002/0027066 A1 3/2002 Kanno et al.
2002/0061436 A1 5/2002 Inagaki et al.
2002/0081478 A1 6/2002 Busenbender
2002/0114990 A1 8/2002 Fly et al.
2002/0136680 A1 9/2002 Kanno et al.
2002/0150822 A1 10/2002 Marlow et al.
2003/0003343 A1 1/2003 Cisar et al.
2003/0099884 A1 5/2003 Chiang et al.
2003/0104280 A1 6/2003 Venkatesan et al.
2003/0108785 A1 6/2003 Wu et al.
2003/0165744 A1 * 9/2003 Schubert et al. ............ 429/303
2004/0002006 A1 * 1/2004 Kelley et al. ............... 429/245
2004/0121238 A1 * 6/2004 Kelley et al. ............... 429/245

FOREIGN PATENT DOCUMENTS

| | | |
|---|---|---|
| EP | 0 610 071 A | 8/1994 |
| EP | 1225160 | 7/2002 |
| GB | 18590 | 8/1910 |
| JP | 61270205 | 11/1986 |
| JP | 63057649 | 3/1988 |
| JP | 6418982 | 1/1989 |
| JP | 2002-220217 | 8/2002 |
| WO | WO 94/23462 | 10/1994 |
| WO | WO 95/06002 | 3/1995 |
| WO | WO 98/02382 | 1/1998 |
| WO | WO 98/27023 | 6/1998 |
| WO | WO 99/11585 | 3/1999 |
| WO | WO 99/11586 | 3/1999 |
| WO | WO 99/61549 | 12/1999 |
| WO | WO 99/64223 | 12/1999 |
| WO | WO 00/16418 | 3/2000 |
| WO | WO 00/43314 | 7/2000 |
| WO | WO 01/66490 | 9/2001 |
| WO | WO 02/18271 | 3/2002 |
| WO | WO 02/18272 | 3/2002 |
| WO | WO 02/094533 | 11/2002 |
| WO | WO 03/028130 | 4/2003 |
| WO | WO 2004/004027 | 1/2004 |
| WO | WO 2004/062005 | 7/2004 |

OTHER PUBLICATIONS

U.S. Appl. No. 10/183,471, filed Jun. 28, 2002.

U.S. Appl. No. 10/324,068, filed Dec. 20, 2002.
U.S. Appl. No. 10/326,257, filed Dec. 23, 2002.
Czerwinski et al., "Electrochemical Behavior of Lead Dioxide Deposited on Retuculated Vitreous Carbon (RVC)," Journal of Power Sources, vol. 64, pp. 29-34, (1997).
Blood et al., "Electrodeposition of Lead Dioxide on Carbon Substrates From a High Internal Phase Emulsion (HIPE)," Journal of Applied Electrochemistry, vol. 34, pp. 1-7, (2004).
International Search Report and Written Opinion of the International Searching Authority for PCT/US2004/042286, dated Jul. 29, 2005.

* cited by examiner

BATTERY INCLUDING CARBON FOAM CURRENT COLLECTORS

This application is a continuation-in-part of U.S. application Ser. No. 10/183,471 filed on Jun. 28, 2002, which is incorporated herein by reference.

TECHNICAL FIELD

This invention relates generally to current collectors for a battery and, more particularly, to carbon foam current collectors for a battery.

BACKGROUND

Electrochemical batteries, including, for example, lead acid and nickel-based batteries, among others, are known to include at least one positive current collector, at least one negative current collector, and an electrolytic solution. In lead acid batteries, for example, both the positive and negative current collectors are constructed from lead. The role of these lead current collectors is to transfer electric current to and from the battery terminals during the discharge and charging processes. Storage and release of electrical energy in lead acid batteries is enabled by chemical reactions that occur in a paste disposed on the current collectors. The positive and negative current collectors, once coated with this paste, are referred to as positive and negative plates, respectively. A notable limitation on the durability of lead-acid batteries is corrosion of the lead current collector of the positive plate.

The rate of corrosion of the lead current collector is a major factor in determining the life of the lead acid battery. Once the electrolyte (e.g., sulfuric acid) is added to the battery and the battery is charged, the current collector of each positive plate is continually subjected to corrosion due to its exposure to sulfuric acid and to the anodic potentials of the positive plate. One of the most damaging effects of this corrosion of the positive plate current collector is volume expansion. Particularly, as the lead current collector corrodes, lead dioxide is formed from the lead source metal of the current collector. Moreover, this lead dioxide corrosion product has a greater volume than the lead source material consumed to create the lead dioxide. Corrosion of the lead source material and the ensuing increase in volume of the lead dioxide corrosion product is known as volume expansion.

Volume expansion induces mechanical stresses on the current collector that deform and stretch the current collector. At a total volume increase of the current collector of approximately 4% to 7%, the current collector may fracture. As a result, battery capacity may drop, and eventually, the battery will reach the end of its service life. Additionally, at advanced stages of corrosion, internal shorting within the current collector and rupture of the cell case may occur. Both of these corrosion effects may lead to failure of one or more of the cells within the battery.

One method of extending the service life of a lead acid battery is to increase the corrosion resistance of the current collector of the positive plate. Several methods have been proposed for inhibiting the corrosion process in lead acid batteries. Because carbon does not oxidize at the temperatures at which lead-acid batteries generally operate, some of these methods have involved using carbon in various forms to slow or prevent the detrimental corrosion process in lead acid batteries. For example, U.S. Pat. No. 5,512,390 (hereinafter the '390 patent) discloses a lead acid battery that includes current collectors made from graphite plates instead of lead. The graphite plates have sufficient conductivity to function as current collectors, and they are more corrosion resistant than lead. Substituting graphite plates for the lead current collectors may, therefore, lengthen the life of a lead-acid battery.

While the battery of the '390 patent may potentially offer a lengthened service life as a result of reduced corrosion at the positive plate, the graphite plates of the '390 patent are problematic. For example, the graphite plates of the '390 patent are dense, flat sheets of material each having a relatively small amount of surface area. Unlike lead electrode plates of a conventional lead-acid battery, which are generally patterned into a grid-like structure to increase the available surface area of the plates, the graphite plates of the '390 patent are smooth sheets with no patterning. In lead acid batteries, an increase in surface area of the current collector may increase the specific energy and power of the battery and, therefore, may translate into improved battery performance. More surface area on the current collectors may also lead to a reduction in the time required for charging and discharging of the battery. The relatively small surface area of the graphite plates of the '390 patent results in poorly performing batteries that have slow charging speeds.

Additionally, the graphite plates of the '390 patent lack the toughness of lead current collectors. The dense, graphite plates of the '390 patent are brittle and may fracture when subjected to physical shock or vibration. Such physical shock and vibration commonly occur in vehicular applications, for example. Any fracturing of the graphite plates would lead to the same problems caused by volume expansion of ordinary lead current collectors. Therefore, despite offering an increased resistance to corrosion compared to conventional lead current collectors, the brittle nature of the graphite plates of the '390 patent could actually result in battery service lives shorter than those possible through use of ordinary lead current collectors.

The present invention is directed to overcoming one or more of the problems or disadvantages existing in the prior art.

SUMMARY OF THE INVENTION

One embodiment of the present invention includes an electrode plate for a battery. The electrode plate includes a carbon foam current collector that has a network of pores. A chemically active material is disposed on the carbon foam current collector such that the chemically active material penetrates into the network of pores.

A second embodiment of the present invention includes a method of making an electrode plate for a battery. This method includes forming a current collector from carbon foam. The carbon foam current collector includes a protruding tab and a network of pores. An electrical connection may be formed at the protruding tab of the current collector. The method also includes applying a chemically active material to the current collector such that the chemically active material penetrates the network of pores in the carbon foam.

A third embodiment of the present invention includes a method of making an electrode plate for a battery. The method includes supplying a wood substrate and carbonizing the wood substrate to form a carbonized wood current collector. Chemically active material may be disposed on the carbonized wood current collector.

A fourth embodiment of the present invention includes a battery. This battery includes a housing, and positive and negative terminals. Within the housing is at least one cell that includes at least one positive plate and at least one negative plate connected to the positive terminal and negative terminal, respectively. An electrolytic solution fills a volume between the positive and negative plates. The at least one positive plate includes a carbon foam current collector including a network of pores, and a chemically active material disposed on the carbon foam current collector such that the chemically active paste penetrates the network of pores.

DETAILED DESCRIPTION

Figure 1:
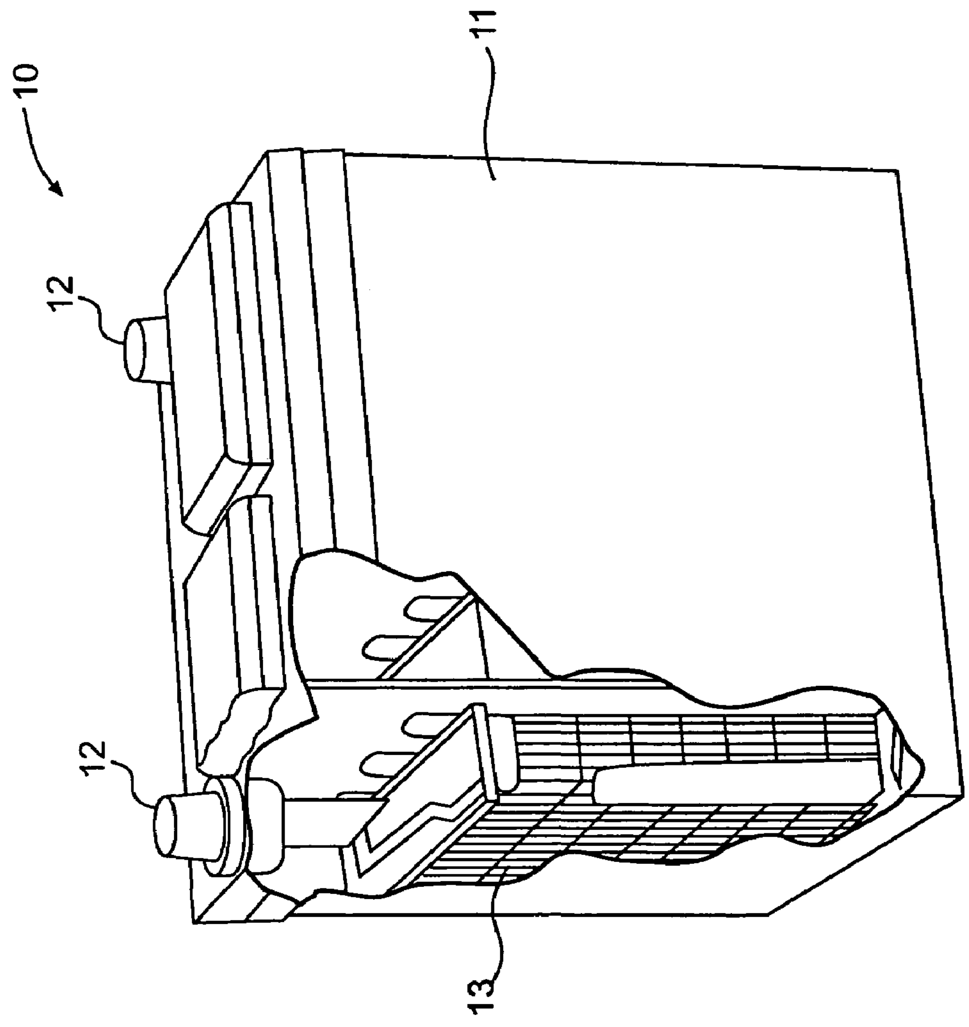
FIG. 1 is a diagrammatic cut-away representation of a battery in accordance with an exemplary embodiment of the present invention.

FIG. 1 illustrates a battery 10 in accordance with an exemplary embodiment of the present invention. Battery 10 includes a housing 11 and terminals 12, which are external to housing 11. At least one cell 13 is disposed within housing 11. While only one cell 13 is necessary, multiple cells may be connected in series or in parallel to provide a desired total potential of battery 10.

Each cell 13 may be composed of alternating positive and negative plates immersed in an electrolytic solution. The electrolytic solution composition may be chosen to correspond with a particular battery chemistry. For example, while lead acid batteries may include an electrolytic solution of sulfuric acid and distilled water, nickel-based batteries may include alkaline electrolyte solutions that include a base, such as potassium hydroxide, mixed with water. It should be noted that other acids and other bases may be used to form the electrolytic solutions of the disclosed batteries.

The positive and negative plates of each cell 13 may include a current collector packed or coated with a chemically active material. The composition of the chemically active material may depend on the chemistry of battery 10. For example, lead acid batteries may include a chemically active material including, for example, an oxide or salt of lead. Further, the anode plates (i.e., positive plates) of nickel cadmium (NiCd) batteries may include cadmium hydroxide ($Cd(OH)_2$) material; nickel metal hydride batteries may include lanthanum nickel ($LaNi_5$) material; nickel zinc (NiZn) batteries may include zinc hydroxide ($Zn(OH)_2$) material; and nickel iron (NiFe) batteries may include iron hydroxide ($Fe(OH)_2$) material. In all of the nickel-based batteries, the chemically active material on the cathode (i.e., negative) plate may be nickel hydroxide.

Figure 2A:
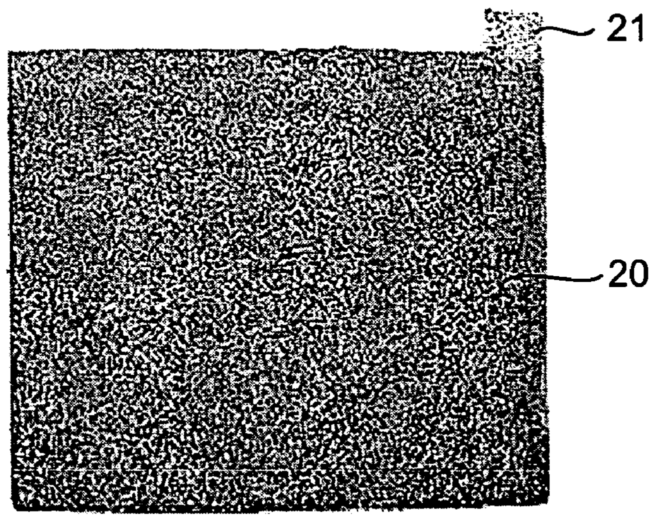
FIGS. 2A and 2B are photographs of a current collector in accordance with an exemplary embodiment of the present invention.

FIG. 2A illustrates a current collector 20 according to an exemplary embodiment of the present invention. Current collector 20 includes a thin, rectangular body and a tab 21 used to form an electrical connection with current collector 20.

The current collector shown in FIG. 2A may be used to form either a positive or a negative plate. As previously stated, chemical reactions in the active material disposed on the current collectors of the battery enable storage and release of energy. The composition of this active material, and not the current collector material, determines whether a given current collector functions as either a positive or a negative plate.

While the type of plate, whether positive or negative, does not depend on the material selected for current collector 20, the current collector material and configuration affects the characteristics and performance of battery 10. For example, during the charging and discharging processes, each current collector 20 transfers the resulting electric current to and from battery terminals 12. In order to efficiently transfer current to and from terminals 12, current collector 20 must be formed from a conductive material. Further, the susceptibility of the current collector material to corrosion will affect not only the performance of battery 10, but it will also impact the service life of battery 10. In addition to the material selected for the current collector 20, the configuration of current collector 20 is also important to battery performance. For instance, the amount of surface area available on current collector 20 may influence the specific energy, specific power, and the charge/discharge rates of battery 10.

In an exemplary embodiment of the present invention, current collector 20, as shown in FIG. 2A, is formed from of a carbon foam material, which may include carbon or carbon-based materials that exhibit some degree of porosity. Because the foam is carbon, it can resist corrosion even when exposed to electrolytes and to the electrical potentials of the positive or negative plates. The carbon foam includes a network of pores, which provides a large amount of surface area for each current collector 20. Current collectors composed of carbon foam may exhibit more than 2000 times the amount of surface area provided by conventional current collectors.

The disclosed foam material may include any carbon-based material having a reticulated pattern including a three-dimensional network of struts and pores. The foam may comprise either or both of naturally occurring and artificially derived materials.

Figure 2B:
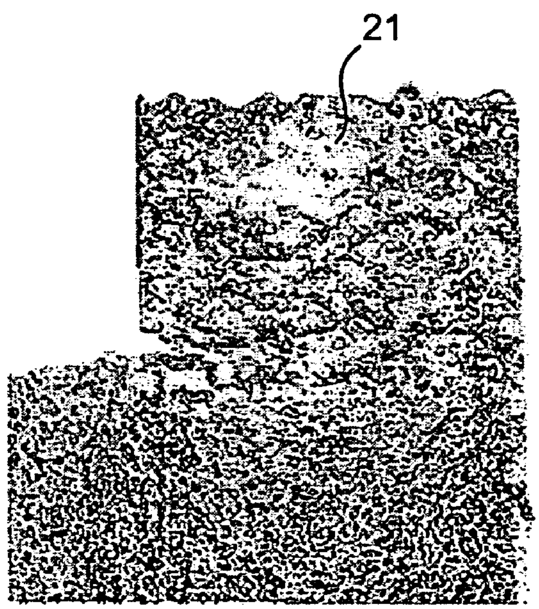

FIG. 2B illustrates a closer view of tab 21, which optionally may be formed on current collector 20. Tab 21 may be coated with a conductive material and used to form an electrical connection with the current collector 20. In addition to tab 21, other suitable configurations for establishing electrical connections with current collector 20 may be used. The conductive material used to coat tab 21 may include a metal that is more conductive than the carbon foam current collector. Coating tab 21 with a conductive material may provide structural support for tab 21 and create a suitable electrical connection capable of handling the high currents present in a lead acid and nickel-based batteries.

Figure 3:
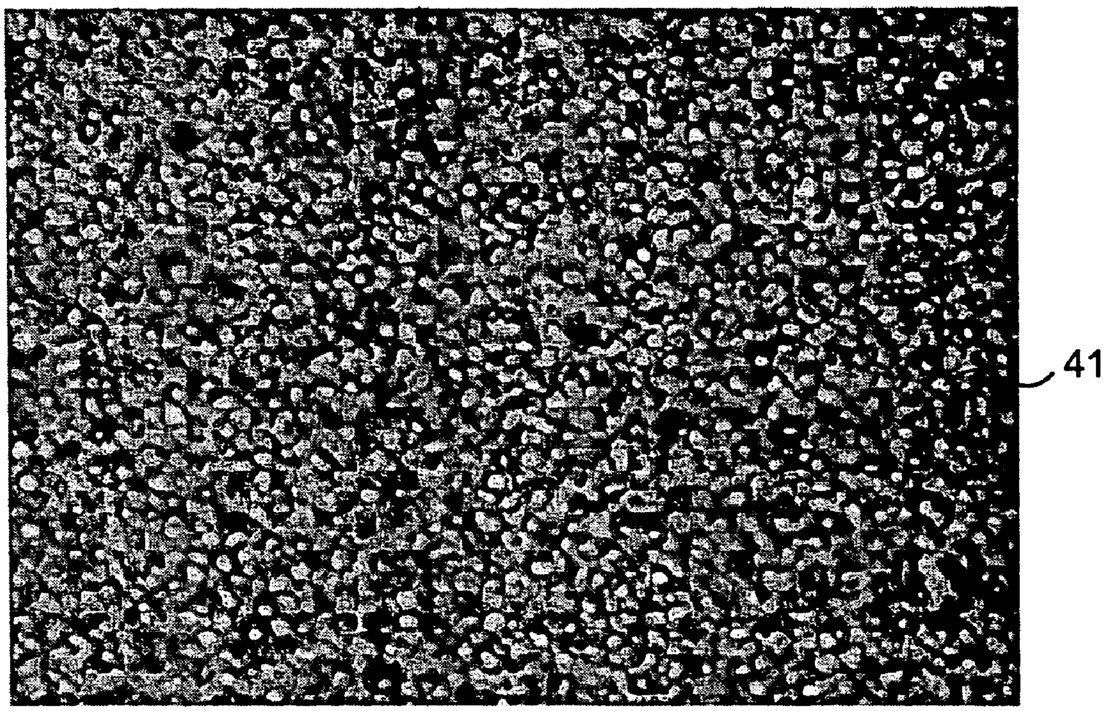
FIG. 3 is a photograph of the porous structure of a carbon foam current collector, at about 10× magnification, in accordance with an exemplary embodiment of the present invention.
Figure 4:
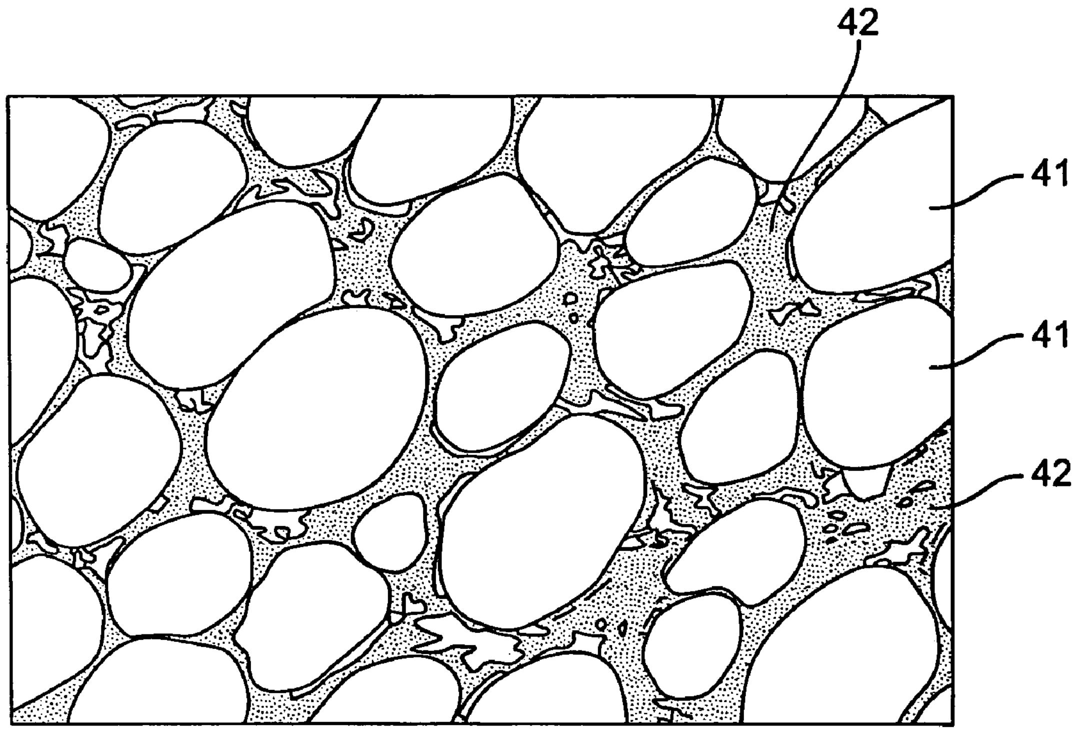
FIG. 4 is a diagrammatic, close-up representation of the porous structure of a carbon foam current collector in accordance with an exemplary embodiment of the present invention.

FIG. 3 provides a view, at approximately 10× magnification, of an exemplary current collector 20, including the network of pores. FIG. 4 provides an even more detailed representation (approximately 100× magnification) of the network of pores. In one embodiment, the carbon foam may include from about 4 to about 50 pores per centimeter and an average pore size of at least about 200 $\mu$m. In other embodiments, however, the average pore size may be smaller. For example, in certain embodiments, the average pore size may be at least about 20 $\mu$m. In still other embodiments, the average pore size may be at least about 40 $\mu$m. While reducing the average pore size of the carbon foam material may have the effect of increasing the effective surface area of the material, average pore sizes below 20 μm may impede or prevent penetration of the chemically active material into pores of the carbon foam material.

Regardless of the average pore size, a total porosity value for the carbon foam may be at least 60%. In other words, at least 60% of the volume of the carbon foam structure may be included within pores 41. Carbon foam materials may also have total porosity values less than 60%. For example, in certain embodiments, the carbon foam may have a total porosity value of at least 30%.

Moreover, the carbon foam may have an open porosity value of at least 90%. Therefore, at least 90% of pores 41 are open to adjacent pores such that the network of pores 41 forms a substantially open network. This open network of pores 41 may allow the active material deposited on each current collector 20 to penetrate within the carbon foam structure. In addition to the network of pores 41, the carbon foam includes a web of structural elements 42 that provide support for the carbon foam. In total, the network of pores 41 and the structural elements 42 of the carbon foam may result in a density of less than about 0.6 gm/cm3 for the carbon foam material.

Due to the high conductivity of the carbon foam of the present invention, current collectors 20 can efficiently transfer current to and from the battery terminals 12, or any other conductive elements providing access to the electrical potential of battery 10. In certain forms, the carbon foam may offer sheet resistivity values of less than about 1 ohm-cm. In still other forms, the carbon foam may have sheet resistivity values of less than about 0.75 ohm-cm.

In addition to carbon foam, graphite foam may also be used to form current collector 20. One such graphite foam, under the trade name PocoFoam™, is available from Poco Graphite, Inc. The density and pore structure of graphite foam may be similar to carbon foam. A primary difference between graphite foam and carbon foam is the orientation of the carbon atoms that make up the structural elements 42. For example, in carbon foam, the carbon may be at least partially amorphous. In graphite foam, however, much of the carbon is ordered into a graphite, layered structure. Because of the ordered nature of the graphite structure, graphite foam may offer higher conductivity than carbon foam. Graphite foam may exhibit electrical resistivity values of between about 100 μΩ-cm and about 2500 μΩ-cm.

The carbon and graphite foams of the present invention may also be obtained by subjecting various organic materials to a carbonizing and/or graphitizing process. In one exemplary embodiment, various wood species may be carbonized and/or graphitized to yield the carbon foam material for current collector 20. Wood includes a natural occurring network of pores. These pores may be elongated and linearly oriented. Moreover, as a result of their water-carrying properties, the pores in wood form a substantially open structure. Certain wood species may offer an open porosity value of at least about 90%. The average pore size of wood may vary among different wood species, but in an exemplary embodiment of the invention, the wood used to form the carbon foam material has an average pore size of at least about 20 microns.

Many species of wood may be used to form the carbon foam of the invention. As a general class, most hardwoods have pore structures suitable for use in the carbon foam current collectors of the invention. Exemplary wood species that may be used to create the carbon foam include oak, mahogony, teak, hickory, elm, sassafras, bubinga, palms, and many other types of wood. Optionally, the wood selected for use in creating the carbon foam may originate from tropical growing areas. For example, unlike wood grown in climates with significant seasonal variation, wood from tropical regions may have a less defined growth ring structure. As a result, the porous network of wood from tropical areas may lack certain non-uniformities that can result from the presence of growth rings.

To provide the carbon foam, wood may be subjected to a carbonization process to create carbonized wood (e.g., a carbon foam material). For example, heating of the wood to a temperature of between about 800° C. and about 1400° C. may have the effect of expelling volatile components from the wood. The wood may be maintained in this temperature range for a time sufficient to convert at least a portion of the wood to a carbon matrix. This carbonized wood will include the original porous structure of the wood. As a result of its carbon matrix, however, the carbonized wood can be electrically conductive and resistant to corrosion. During the carbonization process, the wood may be heated and cooled at any desired rate. In one embodiment, however, the wood may be heated and cooled sufficiently slowly to minimize or prevent cracking of the wood/carbonized wood. Also, heating of the wood may occur in an inert environment.

The carbonized wood may be used to form current collectors 20 without additional processing. Optionally, however, the carbonized wood may be subjected to a graphitization process to create graphitized wood (e.g., a graphite foam material). Graphitized wood is carbonized wood in which at least a portion of the carbon matrix has been converted to a graphite matrix. As previously noted, the graphite structure may exhibit increased electrical conductivity as compared to non-graphite carbon structures. Graphitizing the carbonized wood may be accomplished by heating the carbonized wood to a temperature of between about 2400° C. and about 3000° C. for a time sufficient to convert at least a portion of the carbon matrix of the carbonized wood to a graphite matrix. Heating and cooling of the carbonized wood may proceed at any desired rate. In one embodiment, however, the carbonized wood may be heated and cooled sufficiently slowly to minimize or prevent cracking. Also, heating of the carbonized wood may occur in an inert environment.

In an exemplary embodiment of the present invention, current collector 20 may be made from either carbon foam or from graphite foam. In certain battery chemistries, however, either the current collector of the positive plate or the current collector of the negative plate may be formed of a material other than carbon or graphite foam. For example, in lead acid batteries, the current collector of the negative plate may be made of lead or another suitable conductive material. In other battery chemistries (e.g., nickel-based batteries), the current collector of the positive plate may be formed of a conductive material other than carbon or graphite foam.

The process for making an electrode plate for a battery according to one embodiment of the present invention can begin by forming current collector 20. In one embodiment of the invention, the carbon foam material used to form current collector 20 may be fabricated or acquired in the desired dimensions of current collector 20. Alternatively, however, the carbon foam material may be fabricated or acquired in bulk form and subsequently machined to form the current collectors.

While any form of machining, such as, for example, band sawing and waterjet cutting, may be used to form the current collectors from the bulk carbon foam, wire EDM (electrical discharge machining) provides a method that may better preserve the open-cell structure of the carbon foam. In wire EDM, conductive materials are cut with a thin wire surrounded by de-ionized water. There is no physical contact between the wire and the part being machined. Rather, the wire is rapidly charged to a predetermined voltage, which causes a spark to bridge a gap between the wire and the work piece. As a result, a small portion of the work piece melts. The de-ionized water then cools and flushes away the small particles of the melted work piece. Because no cutting forces are generated by wire EDM, the carbon foam may be machined without causing the network of pores 41 to collapse. By preserving pores 41 on the surface of the current collector, chemically active materials may penetrate more easily into current collector 20.

As shown in FIG. 2A, current collector 20 may include tab 21 used to form an electrical connection to current collector 20. In certain applications, the electrical connection of current collector 20 may be required to carry currents of up to about 100 amps or even greater. In order to form an appropriate electrical connection capable of carrying such currents, the carbon foam that forms tab 21 may be pre-treated by a method that causes a conductive material, such as a metal, to wet the carbon foam. Such methods may include, for example, electroplating and thermal spray techniques. While both of these techniques may be suitable, thermal spray may offer the added benefit of enabling the conductive metal to penetrate deeper into the porous network of the carbon foam. In an exemplary embodiment of the present invention, silver may be applied to tab 21 by thermal spray to form a carbon-metal interface. In addition to silver, other conductive materials may be used to form the carbon-metal interface depending on a particular application.

Once a carbon-metal interface has been established at tab 21, a second conductive material may be added to the tab 21 to complete the electrical connection. For example, a metal such as lead may be applied to tab 21. In an exemplary embodiment, lead wets the silver-treated carbon foam in a manner that allows enough lead to be deposited on tab 21 to form a suitable electrical connection.

A chemically active material, in the form of a paste or a slurry, for example, may be applied to current collector 20 such that the active material penetrates the network of pores in the carbon foam. It should be noted that the chemically active material may penetrate one, some, or all of the pores in the carbon foam. One exemplary method for applying a chemically active material to current collector 20 includes spreading a paste onto a transfer sheet, folding the transfer sheet including the paste over the current collector 20, and applying pressure to the transfer sheet to force the chemically active paste into pores 41. Pressure for forcing the paste into pores 41 may be applied by a roller, mechanical press, or other suitable device. Still another method for applying a chemically active material to current collector 20 may include dipping, painting, or otherwise coating current collector 20 with a slurry of active material. This slurry may flow into pores 41 to coat internal and external surfaces of current collector 20.

As noted above, the composition of the chemically active material used on current collectors 20 depends on the chemistry of battery 10. For example, in lead acid batteries, the chemically active material that is applied to the current collectors 20 of both the positive and negative plates may be substantially the same in terms of chemical composition. Specifically, this material may include lead oxide (PbO). Other oxides and salts of lead, however, may also be suitable. The chemically active material may also include various additives including, for example, varying percentages of free lead, structural fibers, conductive materials, carbon, and extenders to accommodate volume changes over the life of the battery. In certain embodiments, the constituents of the chemically active material for lead acid batteries may be mixed with sulfuric acid and water to form a paste, slurry, or any other type of coating material that may be disposed within pores 41 of current collector 20.

The chemically active material used on current collectors of nickel-based batteries may include various compositions depending on the type of battery and whether the material is to be used on a positive or negative plate. For example, the positive plates may include a cadmium hydroxide ($Cd(OH)_2$) active material in NiCd batteries, a lanthanum nickel ($LaNi_5$) active material in nickel metal hydride batteries, a zinc hydroxide ($Zn(OH)_2$) active material in nickel zinc (NiZn) batteries, and an iron hydroxide ($Fe(OH)_2$) active material in nickel iron (NiFe) batteries. In all nickel-based batteries, the chemically active material disposed on the negative plate may be nickel hydroxide. For both the positive and negative plates in nickel-based batteries, the chemically active material may be applied to the current collectors as, for example, a slurry, a paste, or any other appropriate coating material.

Independent of battery chemistry, depositing the chemically active material on the current collectors 20 forms the positive and negative plates of the battery. While not necessary in all applications, in certain embodiments, the chemically active material deposited on current collectors 20 may be subjected to curing and/or drying processes. For example, a curing process may include exposing the chemically active materials to elevated temperature and/or humidity to encourage a change in the chemical and/or physical properties of the chemically active material.

After assembling together the positive and negative plates to form the cells of battery 10 (shown in FIG. 1), battery 10 may be subjected to a charging (i.e., formation) process. During this charging process, the composition of the chemically active materials may change to a state that provides an electrochemical potential between the positive and negative plates of the cells. For example, in a lead acid battery, the PbO active material of the positive plate may be electrically driven to lead dioxide (PbO2), and the active material of the negative plate may be converted to sponge lead. Conversely, during subsequent discharge of a lead acid battery, the chemically active materials of both the positive and negative plates convert toward lead sulfate. Analogous chemical dynamics are associated with the charging and discharging of other battery chemistries, including nickel-based batteries, for example.

INDUSTRIAL APPLICABILITY

By incorporating carbon into the electrode plates of the battery 10, corrosion of the current collectors may be suppressed. As a result, batteries consistent with the present invention may offer significantly longer service lives.

Additionally, the large amount of surface area associated with the carbon foam or graphite foam materials forming current collectors 20 may translate into batteries having both large specific power and specific energy values. Specifically, because of the open cell, porous network and relatively small pore size of the carbon foam materials, the chemically active material of the positive and negative plates is intimately integrated with the current collectors 20. The reaction sites in the chemically active paste are close to one or more conductive, carbon foam structural elements 42. Therefore, electrons produced in the chemically active material at a particular reaction site must travel only a short distance through the paste before encountering one of the many highly conductive structural elements 42 of current collector 20. As a result, batteries with carbon foam current collectors 20 may offer both improved specific power and specific energy values. In other words, these batteries, when placed under a load, may sustain their voltage above a predetermined threshold value for a longer time than batteries including traditional current collectors made of lead, graphite plates, etc.

The increased specific power values offered by batteries consistent with the present invention also may translate into reduced charging times. Therefore, the disclosed batteries may be suitable for applications in which charging energy is available for only a limited amount of time. For instance, in vehicles, a great deal of energy is lost during ordinary braking. This braking energy may be recaptured and used to charge a battery of, for example, a hybrid vehicle. The braking energy, however, is available only for a short period of time (i.e., while braking is occurring). Thus, any transfer of braking energy to a battery must occur during braking. In view of their reduced charging times, the batteries of the present invention may provide an efficient means for storing such braking energy.

Additionally, the disclosed carbon foam current collectors may be pliable, and therefore, they may be less susceptible to damage from vibration or shock as compared to current collectors made from graphite plates or other brittle materials. Batteries including carbon foam current collectors may perform well in vehicular applications, or other applications, where vibration and shock are common.

Further, by including carbon foam current collectors having a density of less than about 0.6 g/cm3, the battery of the present invention may weigh substantially less that batteries including either lead current collectors or graphite plate current collectors. Other aspects and features of the present invention can be obtained from a study of the drawings, the disclosure, and the appended claims.

What is claimed is:

1. A battery comprising:

a housing;

a positive terminal and a negative terminal;

at least one cell disposed within the housing and including at least one positive plate and at least one negative plate connected to the positive terminal and negative terminal, respectively; and an acidic electrolytic solution filling a volume between the positive and negative plates;

wherein the at least one positive plate further includes a carbon foam current collector including a network of pores, and a chemically active material disposed on the carbon foam current collector such that the chemically active material penetrates the network of pores.

2. The battery of claim 1, wherein the carbon foam current collector has a total porosity value of at least 60% and an open porosity value of at least 90%.

3. The battery of claim 1, wherein the carbon foam current collector has an electrical resistivity value of less than about 1 Ω-cm.

4. The battery of claim 1, wherein the carbon foam current collector includes graphite foam and has an electrical resistivity value of between about 100 $\mu\Omega$-cm and about 2500 $\mu\Omega$-cm.

5. The battery of claim 1, wherein the carbon foam current collector has a density of less than about 0.6 g/cm$^3$.

6. The battery of claim 1, wherein the at least one negative plate further includes a carbon foam current collector including a network of pores and a chemically active material disposed on the carbon foam current collector of the negative plate such that the chemically active material penetrates the network of pores.

7. The battery of claim 1, wherein the chemically active material includes a paste comprising an oxide of lead.

8. The battery of claim 1, wherein the at least one negative plate includes lead.

9. The battery of claim 1, wherein the chemically active material includes a paste comprising lead.

10. The battery of claim 1, wherein the carbon foam current collector includes graphite foam.

11. The battery of claim 1, wherein the carbon foam current collector includes carbonized wood.

12. The battery of claim 1, wherein the carbon foam current collector includes graphitized wood.

13. A battery comprising:

a housing;

a positive terminal and a negative terminal;

at least one cell disposed within the housing and including at least one positive plate and at least one negative plate connected to the positive terminal and negative terminal, respectively; and an acidic electrolytic solution filling a volume between the positive and negative plates;

wherein the at least one negative plate further includes:

a carbon foam current collector including a network of pores, and a chemically active material disposed on the carbon foam current collector such that the chemically active material penetrates the network of pores.

14. The battery of claim 13, wherein the at least one positive plate includes a lead current collector.

15. The battery of claim 13, wherein the carbon foam current collector has a total porosity value of at least 60% and an open porosity value of at least 90%.

16. The battery of claim 13, wherein the carbon foam current collector has an electrical resistivity value of less than about 1 Ω-cm.

17. The battery of claim 13, wherein the carbon foam current collector has a density of less than about 0.6 g/cm$^3$.

18. The battery of claim 13, wherein the chemically active material includes a paste comprising an oxide of lead.

19. The battery of claim 13, wherein the chemically active material includes a paste comprising lead.

20. The battery of claim 13, wherein the carbon foam current collector includes graphite foam.

21. The battery of claim 13, wherein the carbon foam current collector includes carbonized wood.

22. The battery of claim 13 wherein the carbon foam current collector includes graphitized wood.

23. The battery of claim 13, wherein the carbon foam current collector includes graphite foam and has an electrical resistivity value of between about 100 $\mu\Omega$-cm and about 2500 $\mu\Omega$-cm.

* * * * *